(12) United States Patent
Kakegawa

(10) Patent No.: US 8,970,878 B2
(45) Date of Patent: Mar. 3, 2015

(54) SYSTEM, APPARATUS AND METHOD FOR PROCESSING DOCUMENT FOR COMBINED-PAGE OUTPUT

(75) Inventor: Ienobu Kakegawa, Franklin Lakes, NJ (US)

(73) Assignee: Ricoh Company, Ltd., Tokyo (JP)

( * ) Notice: Subject to any disclaimer, the term of this patent is extended or adjusted under 35 U.S.C. 154(b) by 153 days.

(21) Appl. No.: 13/161,921

(22) Filed: Jun. 16, 2011

(65) Prior Publication Data

US 2012/0320409 A1 Dec. 20, 2012

(51) Int. Cl.
*G06K 15/00* (2006.01)
*G06F 3/12* (2006.01)

(52) U.S. Cl.
CPC ............ *G06F 3/1219* (2013.01); *G06F 3/1208* (2013.01); *G06F 3/1252* (2013.01)
USPC .......................................... 358/1.15

(58) Field of Classification Search
USPC ......................................................... 358/1.15
See application file for complete search history.

(56) References Cited

U.S. PATENT DOCUMENTS

| | | | |
|---|---|---|---|
| 2002/0051205 A1* | 5/2002 | Teranishi et al. | 358/1.18 |
| 2003/0090716 A1* | 5/2003 | Umebayashi | 358/1.15 |
| 2009/0051958 A1* | 2/2009 | Ito | 358/1.14 |
| 2009/0279108 A1* | 11/2009 | Hoshi et al. | 358/1.2 |
| 2010/0220356 A1* | 9/2010 | Hamada et al. | 358/1.15 |
| 2011/0299106 A1* | 12/2011 | Mori | 358/1.9 |

* cited by examiner

*Primary Examiner* — Qian Yang
(74) *Attorney, Agent, or Firm* — Copper & Dunham LLP

(57) ABSTRACT

Apparatuses, systems and methods are provided for reducing consumption of paper and other resources in connection with printing, copying, etc, by converting a document suitable for combined-page print, to a combined-page output, even when the user has not specified combined-page output.

14 Claims, 22 Drawing Sheets

Fig. 4

| DETERMINATION INFORMATION | | | |
|---|---|---|---|
| Property | Threshold/Value | | |
| | 2 pages/ surface | 4 pages/ surface | 6 pages/ surface |
| Quantity of words in page | < 300 | < 200 | < 100 |
| Quantity of letters in page | < 1000 | < 900 | < 800 |
| Font size of words/letters in page | > 14 | > 15 | > 16 |
| Includes these data formats | ASCII text .doc .rtf ... ... | ASCII text .doc .rtf ... ... | ASCII text .doc .rtf ... ... |

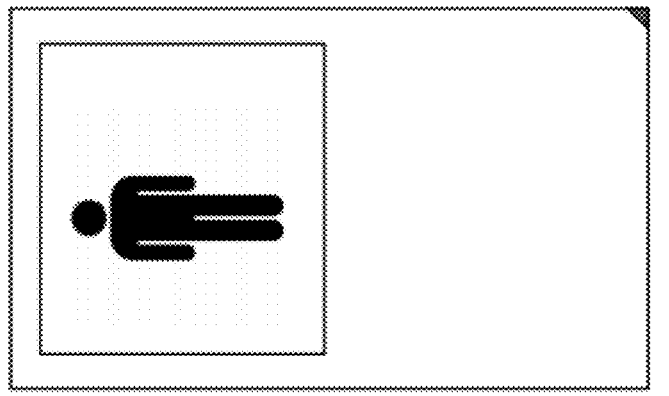
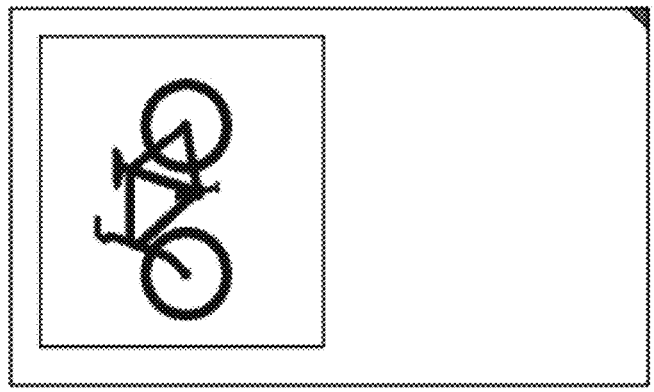
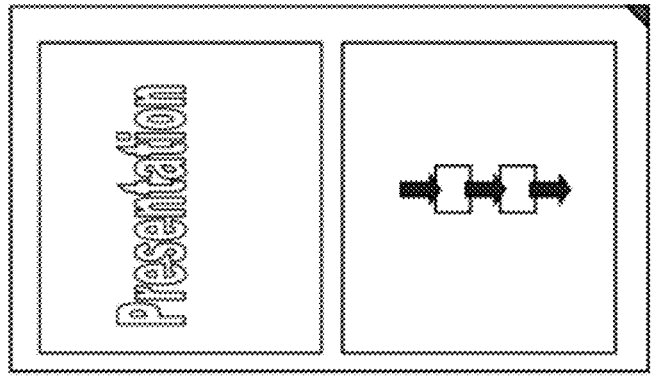
Fig. 5A

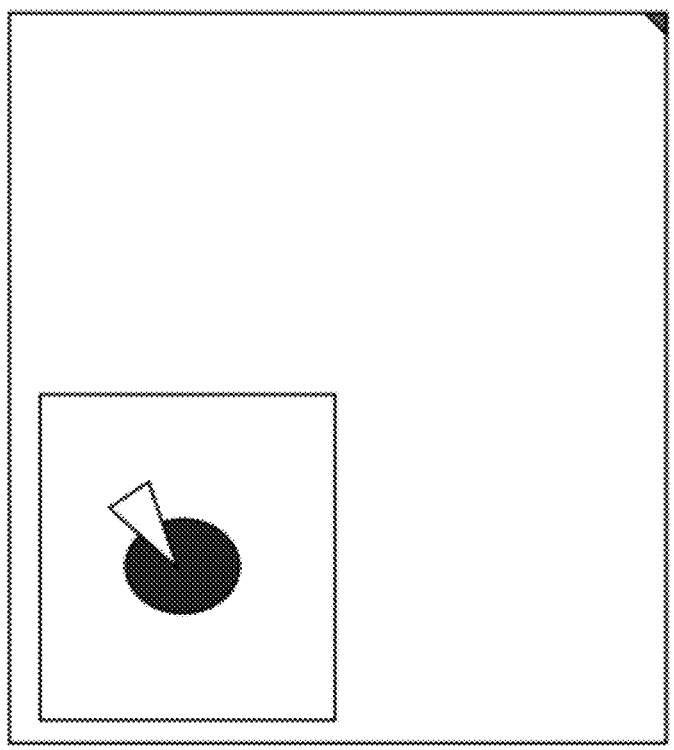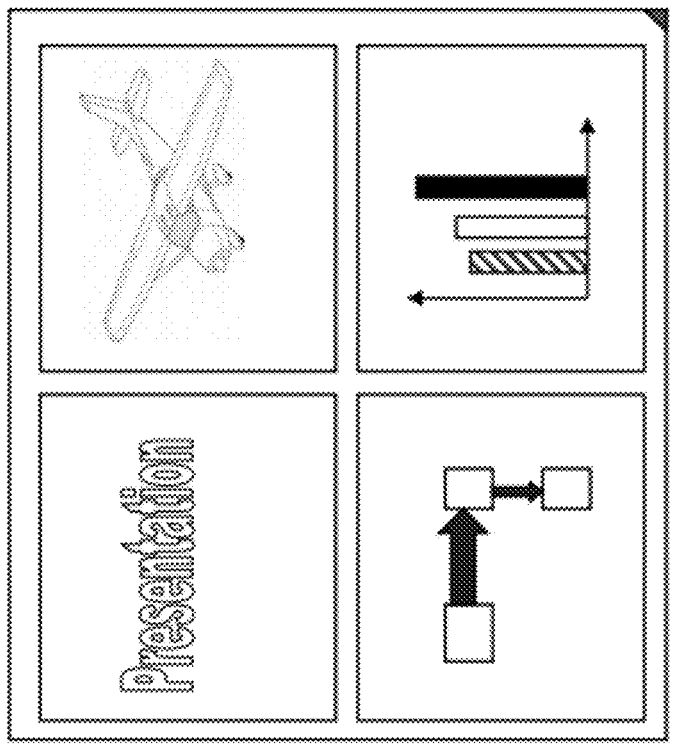
Fig. 11A

Fig. 13

| | Plan A (Recommended by Ricoh) | Plan B (Typical Print Job) | Advantage of Plan A against Plan B |
|---|---|---|---|
| Simplex/Duplex | Duplex | Simplex | Duplex mode to save paper |
| Combined Mode (N-up) | 4 ppt pages onto one surface of paper | No N-up mode (1 page onto one sheet) | N-up mode to save paper and cost with much less printing time |
| B.W or Color Print | Color | Black and White | Expensive color is selected for better communication |
| Paper/set | 3 sheets | 24 sheets | 21 sheets saving per a set : 1/8 of paper used |
| Copy Charge | 6 pages | 24 pages | 18 page saving : 1/4 |
| Printing Time* | May be around 40-50% of Plan B | May be 2.0 - 2.5 times longer than Plan A | Printing time may be less than a half, which is good to have necessary documents ready in a limited time prior to the meeting. Less printing time is also good for energy saving. |
| Paper Cost/set | $0.018 = $0.006 x 3 sheets | $0.144 = $0.006 x 24 sheets | Paper Cost : $3.00/500sheets = $0.006/sheet |
| Copt Charge/set | $0.210 = $0.035 x 6 pages | $ 0.120 = $ 0.005 x 24 pages | B.W. $ 0.005/print, Color : $ 0.035 : Color charge may be 7 times expensive than B/W. |
| Total Cost | $ 0.228/set | $ 0.264/set | 14% cost saving, even in color modes |

Fig. 14

| USAGE HISTORY INFORMATION | | | | |
|---|---|---|---|---|
| Monday | Tuesday | Wednesday | Thursday | Friday |
| 8:01am | 8:47am | 8:01am | 8:59am | 8:45am |
| 9.30am | 9.27am | 9.35am | 9.09am | 9.58am |
| 10.42am | 10.00am | 10.00am | 10.47am | 10.04am |
| 10.50am | 10.41am | 10.01am | 10.53am | 10.33am |
| ... | ... | ... | ... | ... |
| ... | ... | ... | ... | ... |
| 7.40pm | 6.30pm | 7pm | 7.25pm | 6pm |

SYSTEM, APPARATUS AND METHOD FOR PROCESSING DOCUMENT FOR COMBINED-PAGE OUTPUT

TECHNICAL FIELD

This disclosure relates to systems, apparatuses, methodologies, computer program products, etc., for reducing consumption of paper and other resources in connection with printing, copying, etc.

BACKGROUND

In the current information age, information technology (IT) tools are extensively used in enterprises and other organizations in order to facilitate processing of documents and data. For example, IT assets such as computers, printers, plotters, copiers, scanners, multi-function devices (MFDs) and other network-connected or standalone devices can be used in connection with printing, copying, scanning, facsimile, and other types of jobs.

Some printers, copiers, multi-function devices, etc., allow a user to request a print job or copy job to be printed in a duplex or 'double-sided' mode, wherein pages of the original input document are printed on both surfaces of sheets of paper, in order to conserve paper and other resources. Further, it is also known to use a combined-page print mode, wherein more than one page of the input document is printed on a single surface of sheet of paper.

There is a drawback, however, in that pages of the input document may include certain information that, when reproduced in a combined-page print mode, is extremely difficult to read due to the reduced size of details on the printout.

There exists a need for an improved system for processing and outputting information and other data from an input document, while still endeavoring to reduce the consumption of paper and other resources.

SUMMARY

In an aspect of this disclosure, there is provided a tool (for example, an apparatus, application software, etc.) for processing an input document, wherein when a document that includes a plurality of pages is received, the tool determines whether there are one or more groups of two or more consecutive pages in the input document are suitable for output in a combined-page print mode, and processes the input document to generate a combined-page output job wherein for each of said one or more groups of two or more consecutive pages in the input document, plural pages of the two or more consecutive pages are combined to a single page in the combined-page output job, even when the user has not specified combined-page output.

In another aspect, it is determined whether a particular page of the input document is suitable or unsuitable for output in a combined-page print mode, based on a quantity of text in the particular page.

In another aspect, it is determined whether a particular page of the input document is suitable or unsuitable for output in a combined-page print mode, based on a font size of text in the particular page.

In another aspect, it is determined whether a particular page of the input document is suitable or unsuitable for output in a combined-page print mode, based on a format of data in the particular page.

In another aspect, each of respective different pages of the combined-page output job that include one of the pages of the input document determined to be unsuitable for output in the combined-page print mode, does not include any other pages of the input document.

In another aspect, the one or more pages of the input document are arranged in a predetermined order. Further, if a combined-page print mode setting is set to n-pages per sheet, then upto n pages of information of the input document, which are already arranged consecutively in the predetermined order, are included in a single page of the combined-page output job.

In another aspect, each of specific ones of the pages of the input document which have been determined to be unsuitable for output in the combined-page print mode, are included in respective different pages of the combined-page output job in an enlarged size format.

In another aspect, if any page of the input document (i) is determined to be suitable for output in the combined-page print mode and (ii) is also the only page of the input document included on a page of the combined-page output job, then this page is reproduced in a reduced size format.

In another aspect, comparative information including paper consumption information and printing time information corresponding to at least one of the input document and the combined-page output job is generated and displayed.

In another aspect, usage history information indicating a log of jobs performed by an apparatus is maintained, and a time for automatically entering into a power-saving mode is determined based on the usage history information.

In another aspect, a time for automatically entering into a power-saving mode is determined to be a last time a job was performed during a previous day, as indicated in usage history information.

BRIEF DESCRIPTION OF THE DRAWINGS

The aforementioned and other aspects, features and advantages can be more readily understood from the following detailed description with reference to the accompanying drawings wherein:

FIG. 4 shows an example of a table registering information for determining whether a page of an input document is suitable for output in a combined page print mode;

FIGS. 5A and 5B show an example of pages of an input document being reproduced in an intelligent combined-page print mode, with 2 pages per sheet surface, according to an exemplary embodiment;

FIGS. 11A and 11B show an example of pages of an input document being reproduced in an intelligent combined-page print mode, with 4 pages per sheet surface, according to an exemplary embodiment;

FIG. 11C shows an example of the two images reduced to a size necessary for 4-page per sheet printing mode, as shown in FIG. 11B, being instead reduced to a size for 2-page per sheet printing mode;

FIG. 13 illustrates a user interface screen displayed by an image processing apparatus, such as image processing apparatus 100 illustrated in FIG. 1A, according to an exemplary embodiment;

FIG. 14 illustrates an example of a table registering usage history information, according to an exemplary embodiment.

DETAILED DESCRIPTION

Figure 1A:
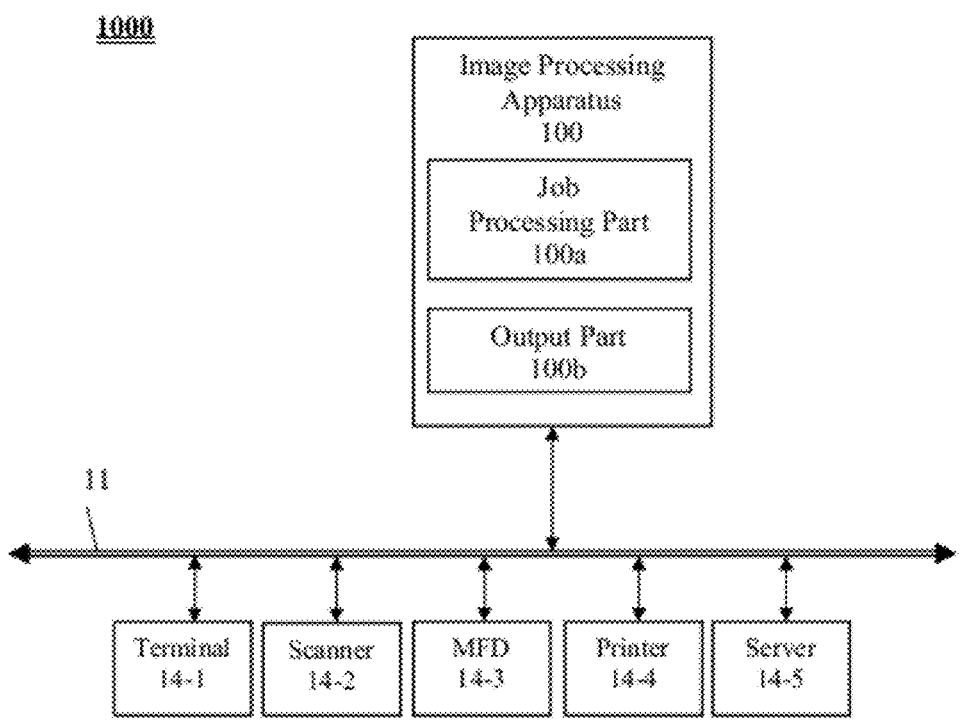
FIGS. 1A-1F show block diagrams of systems, according to exemplary embodiments.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there is described tools (systems, apparatuses, methodologies, computer program products, etc.) for processing and printing data files while reducing consumption of paper and other resources.

For example, FIG. 1A shows schematically a system 1000 for reducing consumption of paper and other resources in connection with printing, copying, etc., according to an exemplary embodiment. System 1000 includes an image processing apparatus 100 that includes a processing part 100a and an output part 100b. System 1000 also includes a plurality of network devices (i.e. network-connected devices) 14-1 through 14-5, all interconnected by a network 11. The plurality of network devices 14-1 through 14-5 includes, for example, a terminal 14-1, scanner 14-2, MFD 14-3, printer 14-4 and network server 14-5. While the examples of this disclosure will simply refer to network devices 14-1 through 14-5 in the interests of brevity, the aspects of this disclosure are applicable to a network having an arbitrary number of devices. The apparatus 100 itself may be any stand-alone or network-connected device including but not limited to a personal, notebook or workstation computer, a terminal, a kiosk, a PDA (personal digital assistant), a tablet computing device, a smartphone, a scanner, a printer, a plotter, a facsimile machine, a multi-function device (MFD), a server, a mobile phone or handset, another information terminal, etc. The apparatus 100 may be configured with software allowing the device to communicate through network 11 with other devices, such as devices 14-1 through 14-5.

Figure 2:
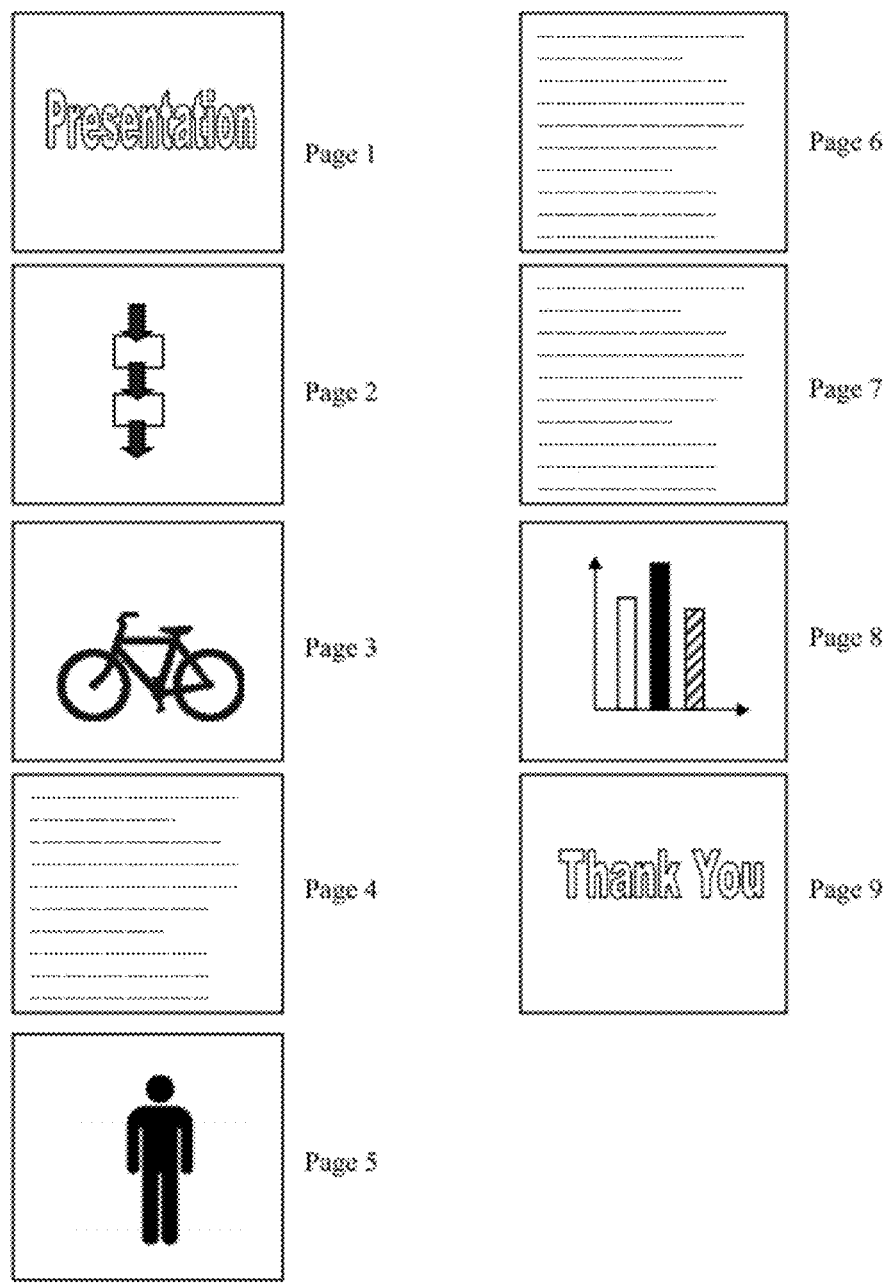
FIG. 2 illustrates an example of pages of an input document received by an image processing apparatus, such as image processing apparatus 100 depicted in FIG. 1A.

The processing part 100a (also referred to in this disclosure as a "job processing part" or a "print job processing part") is configured to receive an input document that includes a plurality of pages. The input document may correspond to, for example, a word processing document, a spreadsheet document, a document including presentation slides/handouts, one or more images or charts, etc. An example of contents of such an input document is illustrated in FIG. 2, which depicts a presentation handout document, for example, that includes 9 pages of slides. As seen in FIG. 2, each of the pages of the input document may include different types of content, such as text data, monochrome image data, color image data, etc.

The input document may be, for example, an electronic document, data file or image data generated by a user of a client terminal (such as terminal 14-1) using application software installed on the client terminal. The input document and instructions to perform a job with respect to the input document (e.g. a print job, copy job, etc.) may be received from the client terminal 14-1 connected to the apparatus 100 via network 11. For instance, when the user of the terminal 14-1 wishes to perform a print job, the user may submit a print job command to a software application operating on the terminal 14-1, wherein the application transmits an input document and print job instruction to the image processing apparatus 100 via network 11. The terminal 14-1 transmitting the input document and/or print instruction may include any stand-alone or network-connected device including but not limited to a personal, notebook or workstation computer, a terminal, a kiosk, a PDA (personal digital assistant), a tablet computing device, a smartphone, a scanner, a printer, a plotter, a facsimile machine, a multi-function device (MFD), a server, a mobile phone or handset, another information terminal, etc. As another example, the input document may be an electronic document, data file or image data generated directly at the image processing apparatus 100 via input controls of the image processing apparatus 100 itself. For example, the apparatus 100 may include application software and a user interface part (including keyboard, mouse or touchscreen) configured to receive user input for generating/editing the input document and user instructions for outputting the input document, as well as user selection of job settings corresponding to the output job.

As another example, the electronic input document may actually be generated by scanning a paper or physical hardcopy of the input document using a scanning device, and then using Optical Character Recognition (OCR) technology to parse the scanned image, detect text and other data in the scanned image, and generate a digital input document including text that corresponds to the hardcopy of the scanned input document. The aforementioned scanning device may be a component of the image processing apparatus 100 itself. Alternatively, the scanning device may be included in the scanner 14-2 or the MFD 14-3, for example, wherein the input document is transmitted to the image processing apparatus 100 via the network 11. Additional aspects or scanning and OCR are conventional (unless otherwise discussed herein), and in the interest of clarity and brevity are not discussed in detail herein.

Figure 1B:
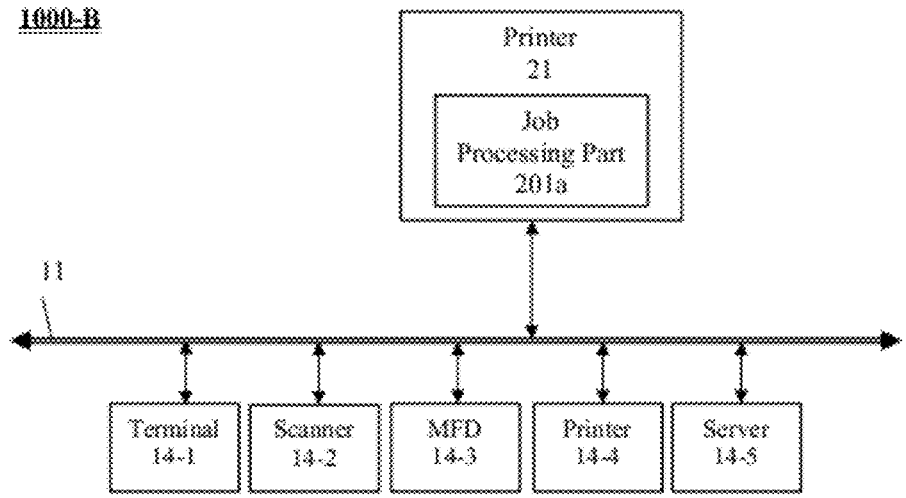

While the example shown in FIG. 1A depicts the image processing apparatus 100 and processing part 100a as being external to the network devices 14-1 through 14-5, one or more components of the image processing apparatus 100, such as the processing part 100*a*, may instead or in addition be a component of a network device. For example, FIG. 1B depicts an example of a system 1000-B according to another exemplary embodiment, wherein job processing part 201*a* is included as a part of a printer 21 connected to the network 11. The job processing part 201*a* may be substantially similar to the processing part 100*a* described above with reference to FIG. 1A. The job processing part 201*a* may function as a printer driver or print application for the printer 21.

Figure 1C:
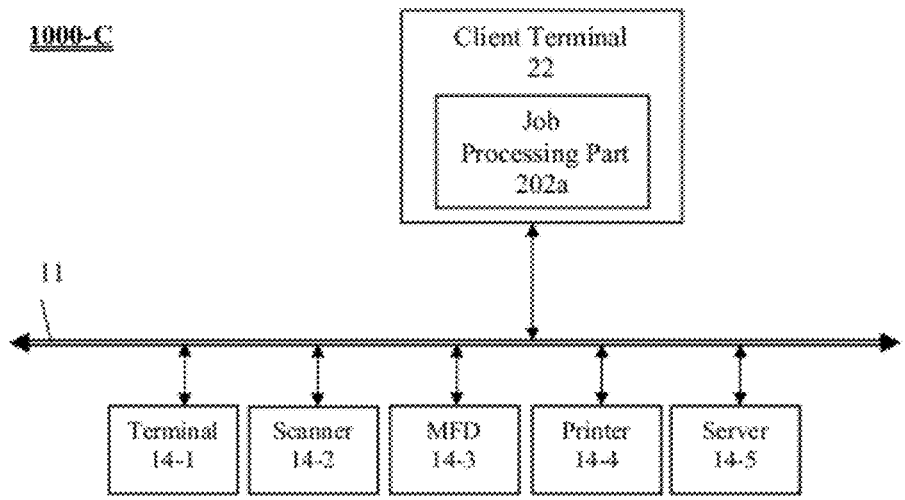
Figure 1D:
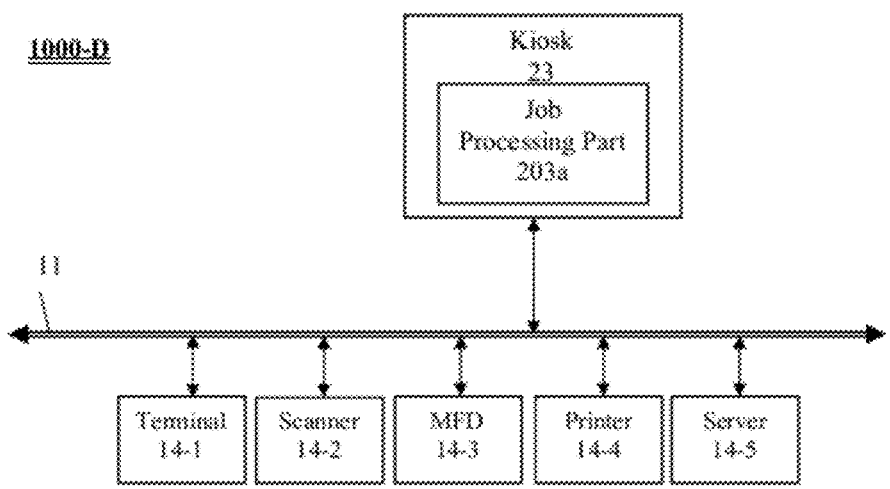
Figure 1E:
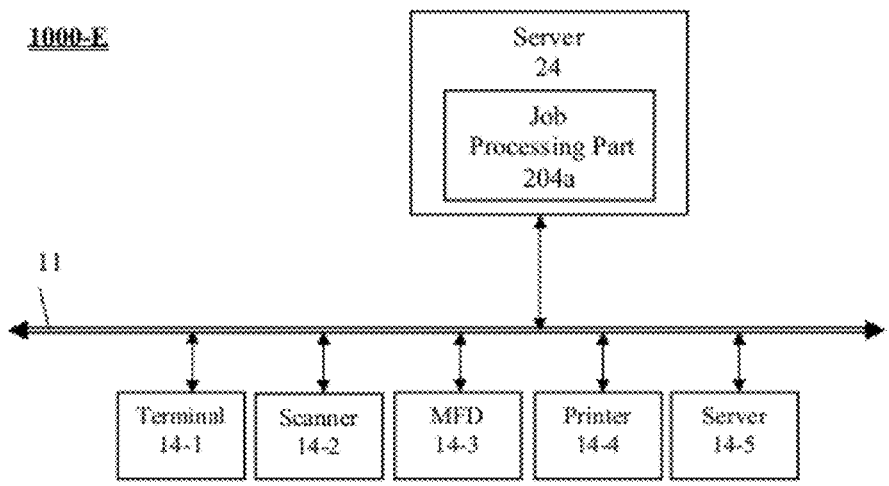
Figure 1F:
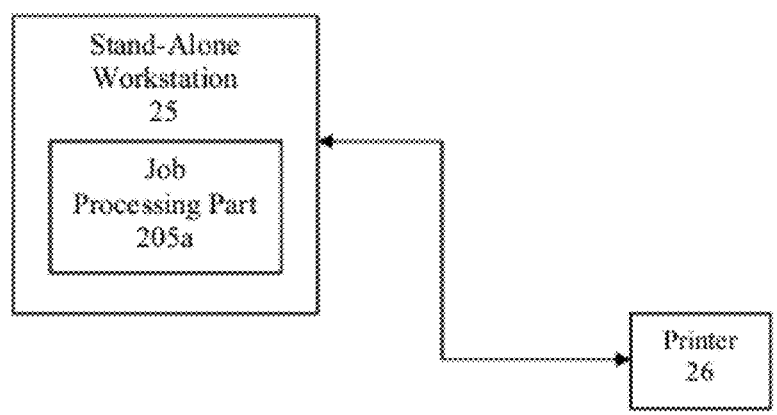

As another example, FIG. 1C depicts an example of a system 1000-C, wherein the job processing part 202*a* is included as a part of a client terminal 22 connected to the network 11. The job processing part 202*a* may be substantially similar to the processing part 100*a* described above with reference to FIG. 1A. The job processing part 202*a* may function as a printer driver or print application for the client terminal 22. Similarly, FIG. 1D depicts an example of a system 1000-D, wherein the job processing part 203*a* is included as a part of a kiosk 23 connected to the network 11. The kiosk may include, for example, a display screen, a keyboard or touchscreen, a printer, etc. The job processing part 203*a* may be substantially similar to the processing part 100*a* described above with reference to FIG. 1A. The job processing part 203*a* may function as a printer driver or print application for the kiosk 23. Likewise, FIG. 1E depicts an example of a system 1000-E, wherein the job processing part 204*a* is included as a part of a print server, mail server or other network server 24 connected to the network 11. The job processing part 204*a* may be substantially similar to the processing part 100*a* described above with reference to FIG. 1A. The server 24 may, for example, manage printing operations for devices connected to the network 11. As another example, FIG. 1F depicts an example of a system 1000-F, wherein the job processing part 205*a* is included as a part of a stand-alone workstation or terminal 25 connected directly to a printer 26. The job processing part 205*a* may be substantially similar to the processing part 100*a* described above with reference to FIG. 1A. The job processing part 205*a* may function as a printer driver or print application for the workstation 25.

Now referring back to FIG. 2 and the 9 pages of input document illustrated therein, it can be seen that each of the pages can include the same or many different types of content. For example, pages 1 and 9 include large text icons such as titles. Pages 2, 3, 5 and 8 include various types of images, graphics, diagrams, pictures, charts, etc. Pages 4, 6 and 7 on the other hand include primarily text information.

Figure 3:
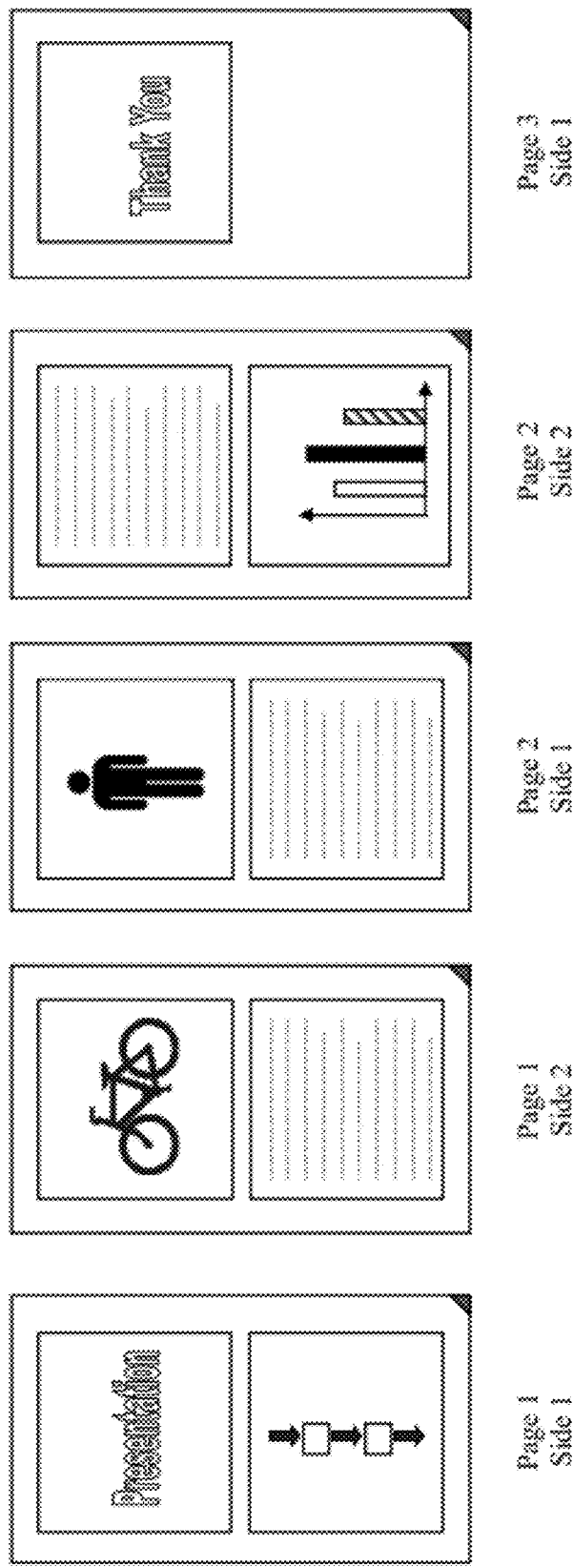
FIG. 3 shows an example of pages of an input document being reproduced in combined-page print mode, with 2 pages per sheet surface.

As described earlier, a conventional 'combined-page' print mode involves printing out more than one page of information of an input document on a single surface of a sheet of paper, wherein each of the pages is reduced in size in order to fit on the single surface of the outputted sheet of paper. The amount of pages of the input document that can be printed on a single sheet of paper varies, and is commonly up to 12 pages on a single sheet of paper. If the contents of the input document illustrated in FIG. 2 are outputted using a conventional 'combined-page' print mode (2 pages per sheet/surface) as well as using a duplex (i.e. double-sided) print setting, then the result may look as that illustrated in FIG. 3. As seen in FIG. 3, information pages 1 and 2 of the original input document have been reproduced on a first side of page 1 of the outputted document, information pages 3 and 4 of the original input document have been reproduced on a second side of page 1 of the outputted document, information pages 5 and 6 of the original input document have been reproduced on a first side of page 2 of the outputted document, information pages 7 and 8 of the original input document have been reproduced on a second side of page 2 of the outputted document, and information page 9 of the original input document has been reproduced on a first side of page 3 of the outputted document.

Due to the fact that each of the original pages of information of the input document are reduced in size in order to fit on each side of the pages of the outputted document, it can be difficult for a user to read some of the information that has been reduced in size. In particular, pages that include substantial text information, such as pages 4, 6 and 7 of the original input document illustrated in FIG. 2, may now be very difficult to read and understand after being reduced in size and outputted in the format illustrated in FIG. 3.

Thus, the image processing apparatus 100 of this embodiment includes an 'intelligent' print mode that automatically outputs an input document in a form where information is easy to read, while still reducing the consumption of paper. More particularly, after the processing part 100*a* receives an input document that includes the plurality of pages, the processing part is configured to determine which ones of the pages in the input document are suitable or unsuitable for output in a combined-page print mode, by parsing and analyzing the data included in each of the pages of the input document.

As one example, the processing part 100*a* may determine that a particular page of the input document is suitable or unsuitable for output in a combined-page print mode by analyzing the amount or quantity of words (or letters) included in the data of that particular page of the input document. If the amount or quantity of words (or letters) in that particular page is greater than a predetermined threshold, such as 50 for example, then the processing part may determine that that particular page of the input document is unsuitable for output in a combined-page print mode. On the other hand, if the amount or quantity of words (or letters) in that particular page is less than or equal to the predetermined threshold, such as 50 for example, then the processing part may determine that that particular page of the input document is suitable for output in a combined-page print mode. The processing part may repeat this procedure for each page of information in the input document. Thus, when the processing part analyzes and parses the data of pages 4, 6 and 7 of the input document illustrated in FIG. 2, the processing part may determine that these pages are unsuitable for output in a combined-page print mode, if the quantity of words (or letters) on each of those pages exceeds the predetermined threshold, for example. On the other hand, when the processing part analyzes and parses the data of pages 1-3, 5 and 8-9 of the input document illustrated in FIG. 2, the processing part may determine that these pages are suitable for output in a combined-page print mode, if the quantity of words (or letters) on each of those pages is less than or equal to the predetermined threshold, for example.

As another example, the processing part 100*a* may determine that a particular page of the input document is suitable or unsuitable for output in a combined-page print mode by analyzing the font size of words (or letters) included in the data of that particular page of the input document. If the font size of words (or letters) in that particular page is less than a predetermined threshold, such as 14 for example, then the processing part may determine that that particular page of the input document is unsuitable for output in a combined-page print mode. On the other hand, if the font size of words (or letters) in that particular page is greater than or equal to the predetermined threshold, such as 14 for example, then the processing part may determine that that particular page of the input document is suitable for output in a combined-page print mode. The processing part may repeat this procedure for each page of information in the input document. Thus, when the processing part analyzes and parses the data of pages 4, 6 and 7 of the input document illustrated in FIG. 2, the processing part may determine that these pages are unsuitable for output in a combined-page print mode, if the font size of words (or letters) on each of those pages is less than the predetermined threshold, for example. On the other hand, when the processing part analyzes and parses the data of pages 1-3, 5 and 8-9 of the input document illustrated in FIG. 2, the processing part may determine that these pages are suitable for output in a combined-page print mode, if the font size of words (or letters) on each of those pages is greater than or equal to the predetermined threshold, for example.

As another example, the processing part 100a may determine that a particular page of the input document is suitable or unsuitable for output in a combined-page print mode by analyzing the format of the data included in that particular page of the input document. If the format of the data included in that particular page matches specific formats, such as a text format, then the processing part may determine that that particular page of the input document is unsuitable for output in a combined-page print mode. On the other hand, if the format of the data included in that particular page includes specific other formats and/or sizes, such as a JPEG file or a TIFF file exceeding a certain data size, then the processing part may determine that that particular page of the input document is suitable for output in a combined-page print mode. The processing part may repeat this procedure for each page of information in the input document. Thus, when the processing part analyzes and parses the data of pages 4, 6 and 7 of the input document illustrated in FIG. 2, the processing part may determine that these pages are unsuitable for output in a combined-page print mode, if the data format on each of those pages is in a text format, for example. On the other hand, when the processing part analyzes and parses the data of pages 1-3, 5 and 8-9 of the input document illustrated in FIG. 2, the processing part may determine that these pages are suitable for output in a combined-page print mode, if the data format on each of those pages includes, for example, a JPEG file or a TIFF file exceeding a certain data size.

In order to make the aforementioned determinations, the processing part 100a may manage and maintain determination information indicating the aforementioned thresholds or values required to make the determinations. For example, FIG. 4 illustrates an example of determination information managed and maintained by the processing part 100a. As seen in FIG. 4, the determination information identifies several properties with respect to pages of information in an input document, such as quantity of words in each page, quantity of letters in each page, font size of words in each page, and various formats of data in each page. The determination information of FIG. 4 also lists a plurality of thresholds corresponding to each of these properties for use in making determination that a particular page of the input document is suitable for output in a combined-page print mode. For example, if the quantity of words in a page is less than 300, then the processing part 100a may determine that that page is suitable for output in a combined-page print mode (2 pages/surface). As another example, if the quantity of letters in a page is less than 900, then the processing part 100a may determine that that page is suitable for output in a combined-page print mode (4 pages/surface). As a further example, if the font size of words in a page is greater than 16, then the processing part 100a may determine that that page is suitable for output in a combined-page print mode (6 pages/surface). As yet another example, if the pages includes printable ASCII characters, the processing part 100a may determine that that page is suitable for output in a combined-page print mode.

Moreover, different thresholds may be established for different types of combined-page print modes, as illustrated in FIG. 4. That is, when combining 2 pages of information of an original input document on one sheet of an output job, each of the original 2 pages will have to be reduced in size a first size, such as X. On the other hand, when combining 6 pages of information of an original input document on one sheet of an output job, each of the original 6 pages will have to be reduced in size to a far greater amount to a second size y much smaller than the first size x. Therefore, it may be possible that a page including around 300 words (for example) of information may be suitable for a combined-page print mode (2 pages/surface), yet not be suitable for a combined-page print mode (6 pages/surface), as reflected in the thresholds illustrated in FIG. 4. The values of the determination information included in FIG. 4 are merely exemplary.

After the processing part 100a determines which ones of the pages in the input document are suitable or unsuitable for output in a combined-page print mode, the processing part 100a may also determine whether there are one or more groups of two or more consecutive pages in the input document are suitable for output in a combined-page print mode. For example, using the procedures described above, the processing part 100a may determine that pages 1-3 of the input document illustrated in FIG. 2 comprises one group of two or more consecutive pages in the input document are suitable for output in a combined-page print mode. As another example, the processing part 100a may determine that pages 8-9 of the input document illustrated in FIG. 2 comprises another group of two or more consecutive pages in the input document are suitable for output in a combined-page print mode.

After the processing part 100a determines whether there are one or more groups of two or more consecutive pages in the input document are suitable for output in a combined-page print mode, the processing part 100a processes the input document to generate a combined-page output job, wherein for each of said one or more groups of two or more consecutive pages in the input document (that were determined to be suitable for output in a combined-page print mode), plural pages of the two or more consecutive pages are combined to a single page in the combined-page output job. Moreover, the specific ones of the pages of the input document that were determined to be unsuitable for output in a combined-page print mode may be presented by themselves on a page of the output job.

Figure 5B:
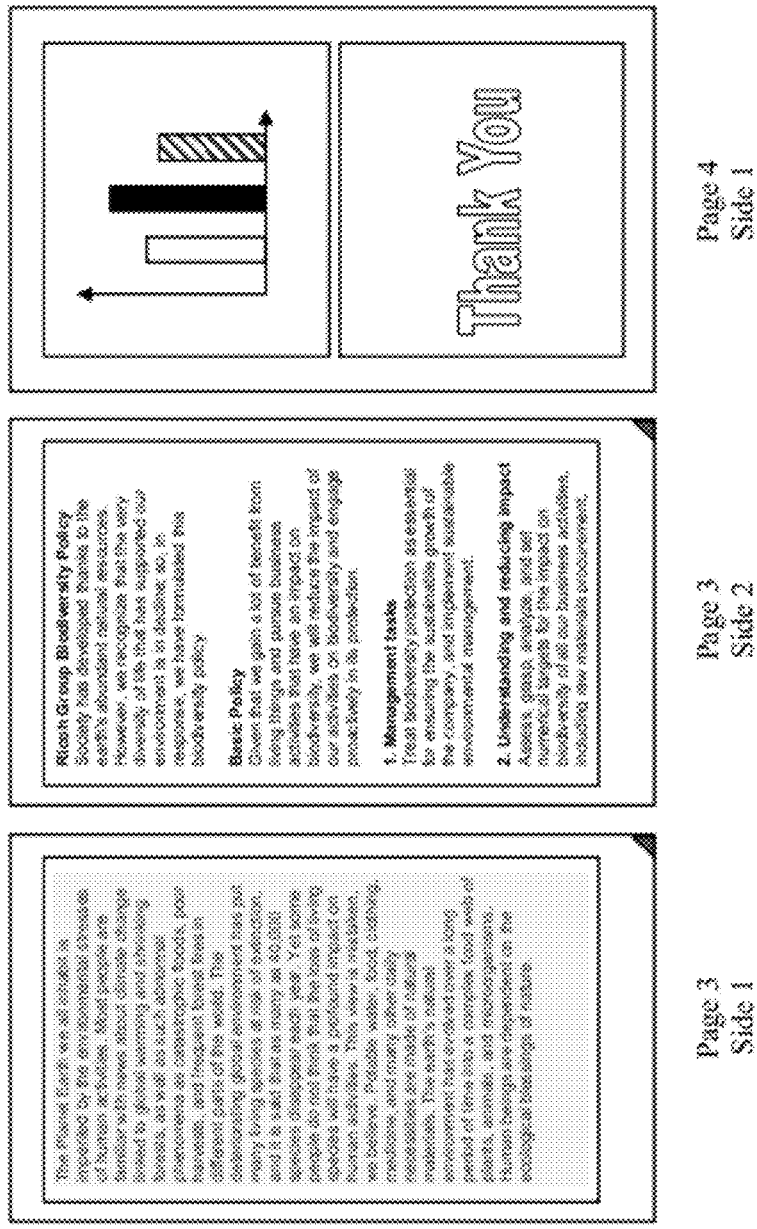

FIGS. 5A and 5B illustrate an example of a duplex, combined-page (2 pages/sheet) output job generated by the intelligent image processing apparatus of the present application, based on the input document illustrated in FIG. 2. As seen in FIGS. 5A and 5B, the specific ones of the pages of the input document (i.e. pages 4, 6 and 7) that were determined to be unsuitable for output in a combined-page print mode are included in separate, dedicated pages of the combined-page output job (specifically, in side 1 of page 2 and sides 1 and 2 of page 3). Further, since these specific pages appear on separate, dedicated pages of the combined-page output job, they may be enlarged in size for easier viewing by users, as illustrated in FIGS. 5A and 5B.

As seen in the combined-page output job of FIGS. 5A and 5B, for each of said one or more groups of two or more consecutive pages in the input document, plural pages of the two or more consecutive pages are combined to a single page in the combined-page output job. For example, for the group of consecutive pages 1-3 in the input document illustrated in FIG. 2, consecutive pages 1 and 2 of the input document have been combined to a single page (i.e. page 1, side 1) in the combined-page output job of FIG. 5. Similarly, for the group of consecutive pages 8-9 in the input document illustrated in FIG. 2, consecutive pages 8-9 of the input document have been combined to a single page (i.e. page 4, side 1) in the combined-page output job of FIG. 5.

The processing part 100a may then transmit the combined-page output job to the output part 100b for output. For example, the output part 100b may include a print or plotter device configured to output a hardcopy of the combined-page output job. Alternatively, the output 100b may include a communication component to transmit the combined-page output job via the network 11 to the terminal 15-1, MFD 14-3, printer 14-4 or any another network-connected device. If the combined-paged output job is transmitted by the output part 100b via the network to the MFD 14-3 or printer 14-4, for example, then the MFD 14-3 or printer 14-4 may output a hardcopy of the combined-page output job.

Thus, according to this exemplary embodiment, there is provided an intelligent image processing apparatus capable of processing and outputting data from an input document in a combined-page print mode to reduce the consumption of paper and other resources, wherein certain pages of the input document may be output on separate, dedicated pages. Thus, the readability or legibility of the outputted document is greatly increased, while paper and energy are conserved.

While the example shown in FIG. 1A includes one image processing apparatus and five other network devices 15-1 through 15-4, it should be appreciated that such numbers of devices, terminals and apparatuses are arbitrary and are selected as an example in order to facilitate discussion, and that the subject matter of this disclosure can be implemented in a system including one or more systems, servers, apparatuses and terminals. Other devices, such as other scanners, printers and multi-function devices may also be connected to a network, as is well known in the art. Further, the error reporting management apparatus and network devices may be connected in a different network arrangement to that depicted in FIG. 1A.

The network 11 can include one or more of a secure intranet or extranet local area network, a wide area network (WAN), any type of network that allows secure access, etc., or a combination thereof. Further, other secure communications links (such as a virtual private network, a wireless link, etc.) may be used as well as the network connections. In addition, the image processing apparatus may be connected to a network that employs TCP/IP (Transmission Control Protocol/Internet Protocol), but other protocols such as SNMP (Simple Network Management Protocol) and HTTP (Hypertext Transfer Protocol) can also be used. How devices can connect to and communicate over the networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

The image processing apparatus of this disclosure may be realized by a computer program product including a computer-usable, non-transient medium (such as a disk storage apparatus) having instructions tangibly embodied therein that are executed by a computer. Thus, it should be understood that the image processing apparatus may be executed on a computer. The image processing apparatus may be executed on a client terminal and/or network-connected device. The functionalities of the processing part 100a may be provided by a software application such as a printer driver, print application, another application, an operating system (OS), firmware, etc., operating on a terminal and/or network-connected device.

The image processing apparatus may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

Image processing apparatus 100 is not limited to a computer or server, but can be manifested in any of various devices that can be configured to communicate over a network and/or the Internet, including but not limited to a personal, notebook or workstation computer, a terminal, a kiosk, a PDA (personal digital assistant), a tablet computing device, a smartphone, a scanner, a printer, a facsimile machine, a multi-function device (MFD), a server, a mobile phone or handset, another information terminal, etc. Each device may be configured with software allowing the device to communicate through networks with other devices. It should be understood that the image processing apparatus 100 may be the device that is actually performing the output job (e.g. copy job, scanning job, etc.), or the image processing apparatus may be connected via the network 11 to another device (such as MFD 14-3 or printer 14-4) that is performing the output job. Similarly, it should be understood that one or more of the processing functions described above as being performed by the processing part 100a may instead be performed by another device connected to the image processing apparatus 100 via the network 11, such as terminal 14-1, MFD 14-3 or server 14-5.

Figure 6:
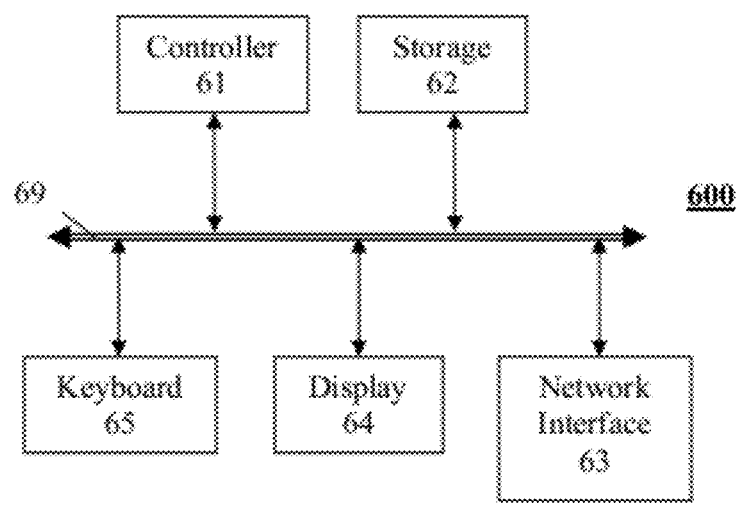
FIG. 6 shows a block diagram of an exemplary configuration of a computer that can be used to implement an image processing apparatus, such as image processing apparatus 100 illustrated in FIG. 1A.

FIG. 6 shows an exemplary constitution of an image processing apparatus as a computer, for example, that can be configured through software to provide the image processing apparatus 100 illustrated in FIG. 1A. As shown in FIG. 6, the image processing apparatus 600 includes a controller (or central processing unit) 61 that communicates with a number of other components, including memory or storage part 62, network interface 63, display 64 and keyboard 65, by way of a system bus 69.

The image processing apparatus 600 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In image processing apparatus 600, the controller executes program code instructions that controls device operations. The controller 61, memory/storage 62, network interface 63, display 64 and keyboard 65 are conventional, and therefore in order to avoid occluding the inventive aspects of this disclosure, such conventional aspects will not be discussed in detail herein.

The image processing apparatus 600 includes the network interface 63 for communications with other devices through a network. However, it should be appreciated that the subject matter of this disclosure is not limited to such configuration. For example, the image processing apparatus 600 may communicate with client terminals through direct connections and/or through a network to which some components are not connected. As another example, the image processing apparatus 600 need not be provided by a server that services terminals, but rather may communicate with the devices on a peer basis, or in another fashion.

In one embodiment, image processing apparatus 100 may be manifested as a multi-function device, which may be any apparatus (including a microprocessor chip or a collection of devices having varying degrees of integration) that has the ability to perform two or more functionalities. The multi-function device may be a terminal or any computing device including but not limited to a personal, notebook or workstation computer, a kiosk, a PDA (personal digital assistant), a tablet computing device, a smartphone, a scanner, a printer, a facsimile machine, a server, a mobile phone or handset, another information terminal, etc.

Figure 7:
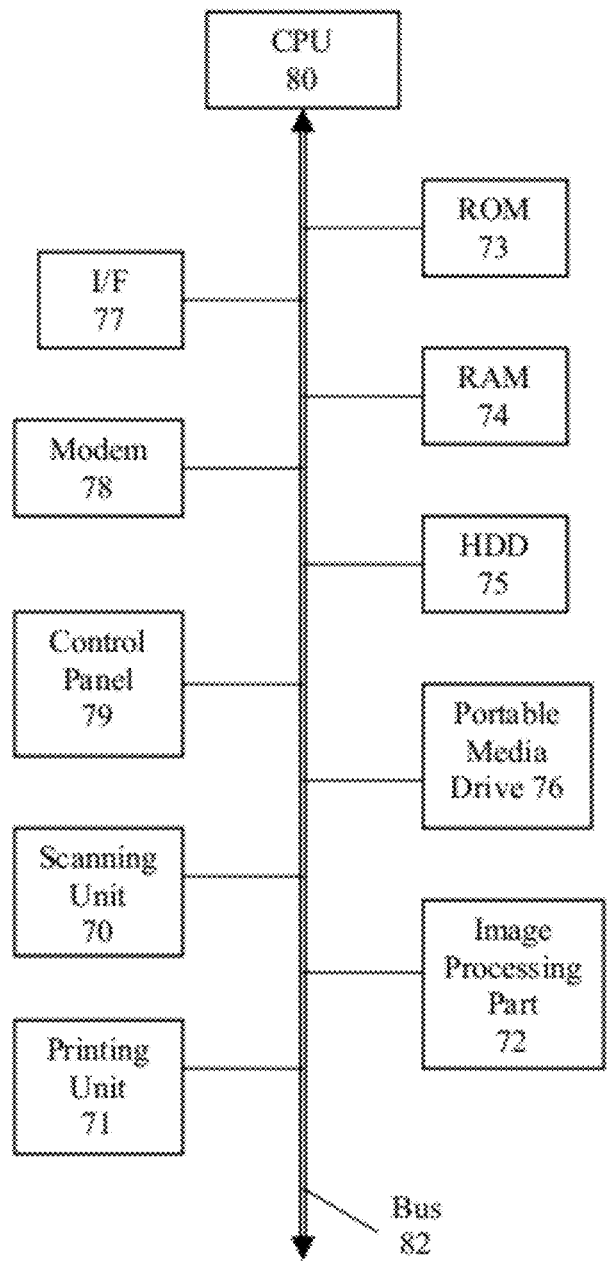
FIG. 7 shows a block diagram of an exemplary configuration of a multi-function device that can be used to implement an image processing apparatus, such as image processing apparatus 100 illustrated in FIG. 1A.

An example of a configuration of a multi-function device is shown schematically in FIG. 7. Device 700 includes a central processing unit (CPU) 80, and various elements connected to the CPU 80 by an internal bus 82. The CPU 80 services multiple tasks while monitoring the state of the device 700. The elements connected to the CPU 80 include a scanning unit 70, a printing unit 71, an image processing part 72, a read only memory (for example, ROM, PROM, EPROM, EEPROM, etc.) 73, a random access memory (RAM) 74, a hard disk drive (HDD) 75, portable media (for example, floppy disk, optical disc, magnetic discs, magneto-optical discs, semiconductor memory cards, etc.) drives 76, a communication interface (I/F) 77, a modem unit 78, and an operation panel 79.

Program code instructions for the device 700 can be stored on the read only memory 73, on the HDD 75, or on portable media and read by the portable media drive 76, transferred to the RAM 74 and executed by the CPU 80 to carry out the instructions. These instructions can include the instructions to the device to perform specified ones of its functions and permit the device 700 to interact with other network devices, and to control the operation panel 79 and the image processing part 72 of the device 700. The operation panel 79 includes a display screen that displays information allowing the user of the device 700 to operate the device 700. The display screen can be any of various conventional displays (such as a liquid crystal display, a plasma display device, a cathode ray tube display, etc.), but is preferably equipped with a touch sensitive display (for example, liquid crystal display), and configured to provide the GUI based on information input by an operator of the device, so as to allow the operator to conveniently take advantage of the services provided by the system. The display screen does not need to be integral with, or embedded in, the operation panel 79, but may simply be coupled to the operation panel by either a wire or a wireless connection. The operation panel 79 may include keys for inputting information or requesting various operations. Alternatively, the operation panel 79 and the display screen may be operated by a keyboard, a mouse, a remote control, touching the display screen, voice recognition, or eye-movement tracking, or a combination thereof. The device 700 is a multifunction device (with scanner, printer and image processing) and in addition can be utilized as a terminal to download documents from a network.

Additional aspects or components of the device 700 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 8:
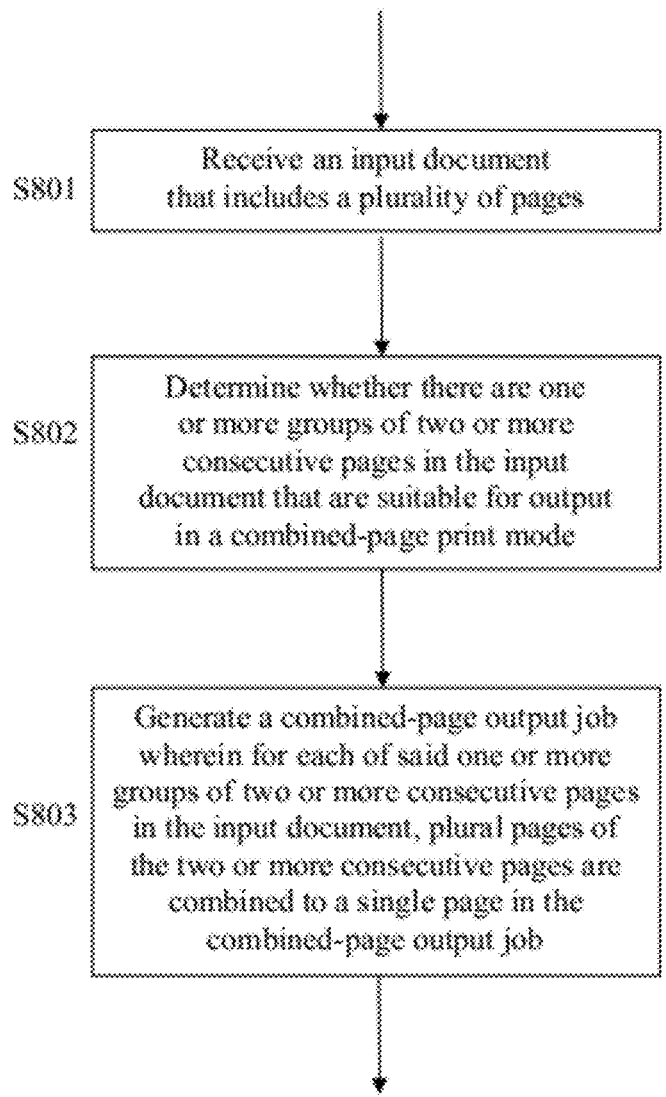
FIG. 8 shows a flowchart of a method performed by an image processing apparatus, such as image processing apparatus 100 illustrated in FIG. 1A, according to an exemplary embodiment.

Turning now to FIG. 8, there is shown a flowchart of a method performed by an image processing apparatus, such as image processing apparatus 100 illustrated in FIG. 1A, according to an exemplary embodiment.

In S801, the image processing apparatus receives an input document that includes a plurality of pages. An example of the contents of such an input document are illustrated in FIG. 2. In S802, the image processing apparatus determines whether there are one or more groups of two or more consecutive pages in the input document that are suitable for output in a combined-page print mode. Then, in S803, the image processing apparatus processes the input document to generate a combined-page output job, wherein for each of said one or more groups of two or more consecutive pages in the input document, plural pages of the two or more consecutive pages are combined to a single page in the combined-page output job. An example of such a combined-page output job is illustrated in FIGS. 5A and 5B.

Figure 9A:
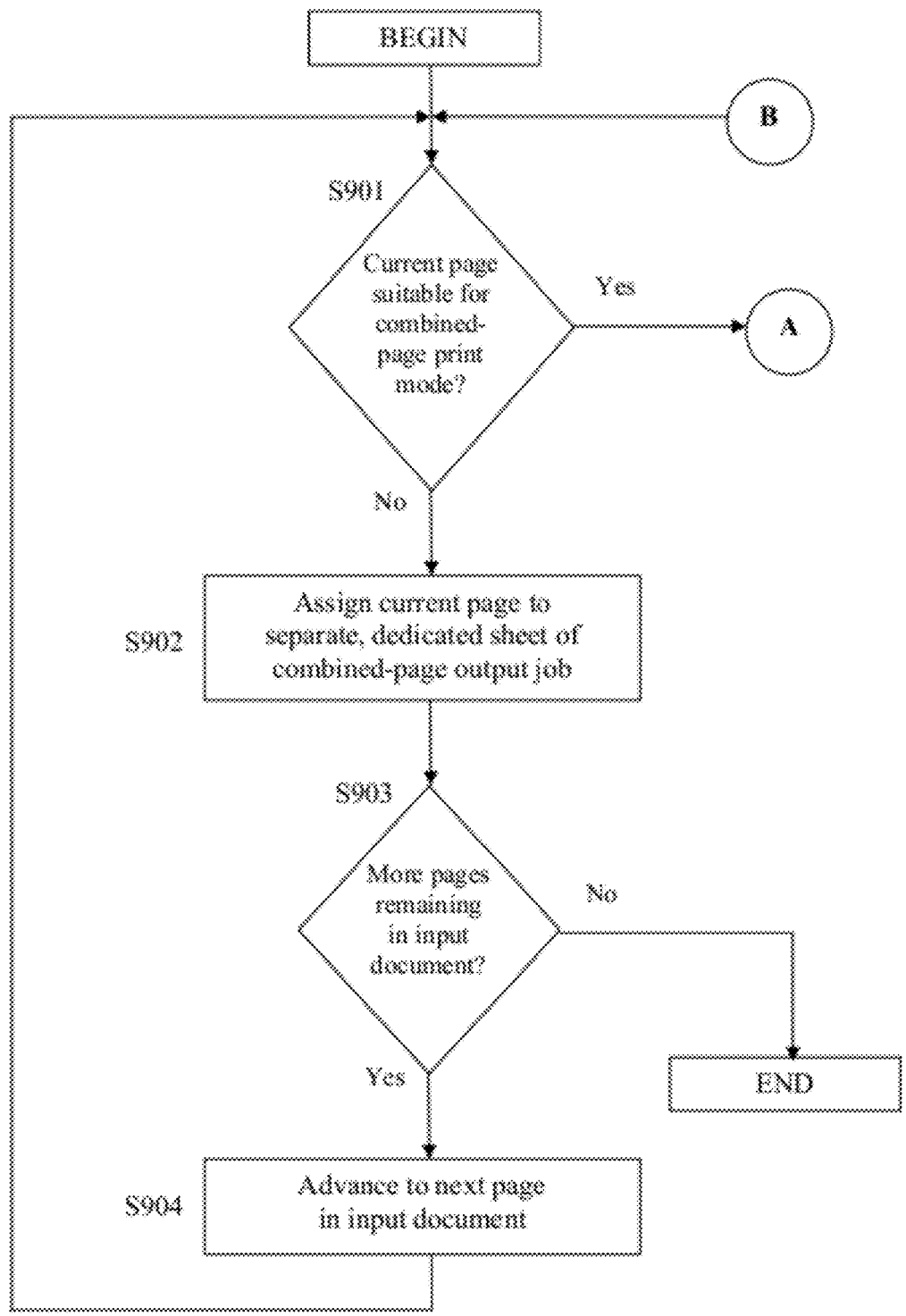
FIGS. 9A and 9B show a flowchart of a method performed by an image processing apparatus, such as image processing apparatus 100 illustrated in FIG. 1A, according to an exemplary embodiment.
Figure 9B:
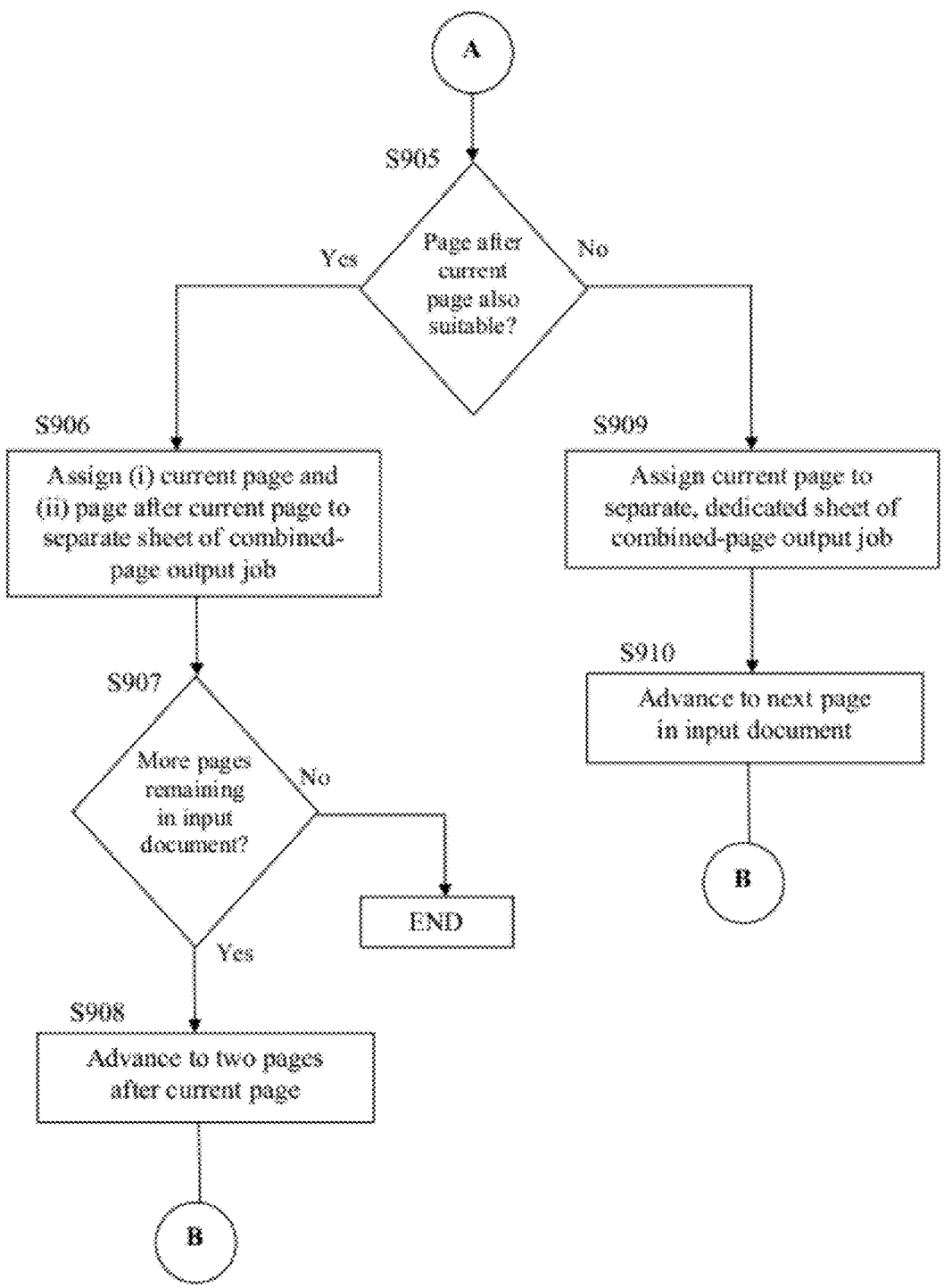

Turning now to FIGS. 9A and 9B, there is shown a flowchart of a method performed by an image processing apparatus to generate a combined-page output job. The method of FIGS. 9A and 9B is now discussed with reference to the input document illustrated in FIG. 2 and the resulting combined-page output job illustrated in FIGS. 5A and 5B.

The image processing apparatus analyzes each page of the input document illustrated in FIG. 2 in the order in which they appear in the input document. Thus, when the process begins, the 'current page' analyzed by the image processing apparatus is the first page 1 of the input document. In S901 the image processing apparatus determines whether the current page is suitable for combined-page print mode. If the current page is not suitable for combined-page print mode (S901, No), as would be the case if the 'current page' is page 4 of the original input document for example, using the procedures described earlier in this disclosure, then in S902 the apparatus assigns the current page to separate, dedicated sheet of combined-page output job. For example, if the current page is page 4 of the original input document, than page 4 of the original input document will be assigned to a separate, dedicated page, such as side 1 of page 2 of the combined page output job illustrated in FIG. 5A. Thereafter, in S903 the apparatus determines whether any other pages (after the current page) remain to be analyzed in the input document. If no other pages remain (S903, No), then the process ends. If other pages remain (S903, Yes), then the page analyzed by the apparatus (i.e. the 'current' page) is advanced to the next page in the input document in S904, and then the workflow returns to S901.

If the current page analyzed in S901 is, in fact, suitable for combined-page print mode (S901, Yes) then in S905 the apparatus determines whether the page after the current page is also suitable for output in the combined-page print mode. For example, if the current page is page 1 of the input document, then in S901 the apparatus will determine that the current page (page 1) of the input document is suitable for output in the combined-page print mode, and in S905 the apparatus will determine that the page after the current page (i.e. page 2) of the input document is also suitable for output in the combined-page print mode. (Note that if there are no other pages in the input document, and the current page is the last page, then the process may end here.)

If the apparatus determines that the page after the current page is also suitable for output in the combined-page print mode (S905, yes), then the S906 the apparatus assigns both (i) the current page and (ii) the page after the current page to be included in a single side of a paper sheet of the combined-page output job. For example, if the current page is page 1 of the input document, then in S906 the apparatus will assign both (i) the current page (i.e. page 1 of the input document) and (ii) the page after the current page (i.e. page 2 of the input document) to be included in a single side of a paper sheet of the combined-page output job (such as page 1, side 1 in FIG. 5A). Thereafter, in S907 the apparatus determines whether any other pages (other than the current page and the page after the current page that were just assigned) still remain to be analyzed in the input document. If no other pages remain (S907, No), then the process ends. If other pages remain (S907, Yes), then in S908 the page analyzed by the apparatus (i.e. the 'current' page) is advanced two pages in the input document. For example, if the current page is page 1 of the input document, and page 1 and page 2 of the input document have already been assigned in S906, then in S908 the 'current' page is advanced two pages, so that the new current page in the next iteration of the method will be page 3 of the input document. The workflow then returns to S901.

In S905, if the apparatus determines that the page after the current page is not suitable for output in the combined-page print mode (S905, No), then the workflow proceeds to S909. For example, if the current page is page 5 of the input document, the apparatus will determine in S905 that the page after the current page (i.e. page 6 of the input document) is not suitable for output in the combined-page print mode (S905, No), and the workflow will proceed to S909. In S909, the apparatus assigns only the current page to a separate dedicated sheet of the combined-page output job. For example, if the current page is page 5 of the input document, the apparatus may assign page 5 of the input document to a separate dedicated sheet of the combined-page output job, such as page 2, side 2 in FIG. 5A. Then in S910, the page analyzed by the apparatus (i.e. the 'current' page) is advanced to the next page in the input document, and then the workflow returns to S901.

As seen in FIGS. 5A and 5B, when pages of the original input document unsuitable for reproduction in combined-page print mode (such as pages 4, 6 and 7 of the input document illustrated in FIG. 2) are assigned to separate pages in the output job (such as page 2, side 1, page 3 sides 1 and 2 of the output job of FIG. 5), these pages of information may be maximized in size by the processing part 100a so that they are easier to read. Further, as seen in FIGS. 5A and 5B, certain pages of the original input document that were suitable for reproduction in combined-page print mode were nevertheless assigned to separate, dedicated pages in the output job (such as pages 3 and 5 of the input document of FIG. 3, that were assigned to page 1, side 2 and page 2, side 2 respectively of the output job of FIG. 5). This is due to the fact that these pages could not be combined with subsequent pages in the original order of the input document, since the subsequent pages were determined to be unsuitable for combined-page print mode. As seen in FIG. 5, even though these pages (pages 3 and 5 of the input document) appear on their own dedicated pages of the output job, these pages may still be reproduced in small size, since they have already been determined as pages suitable for output in combined mode (that is, they have determined to be pages that can be reduced in size without significant determent in readability). This approach is advantageous, since toner ink consumed when outputting the smaller-sized portions is thereby reduced. Such approach is optional, and these pages may be maximized in size.

While the exemplary output job illustrated in FIG. 5 was generated using a duplex mode, the aspects of this disclosure can similarly be applied to generate a combined-page output job in simplex (single-sided mode). Moreover, while the exemplary output job illustrated in FIG. 5 was generated using portrait images, the aspects of this disclosure can similarly be applied to generate a combined-page output job using landscape images. That is, the processing part may analyze the data and format of the information pages in the input document, and determine that the combined-page output job should output pages in landscape and/or portrait format. Further, while the exemplary output job illustrated in FIG. 5 was generated using 2-pages per sheet print mode, the aspects of this disclosure can similarly be applied to generate a combined-page output job with other numbers of pages per sheet.

Figure 10:
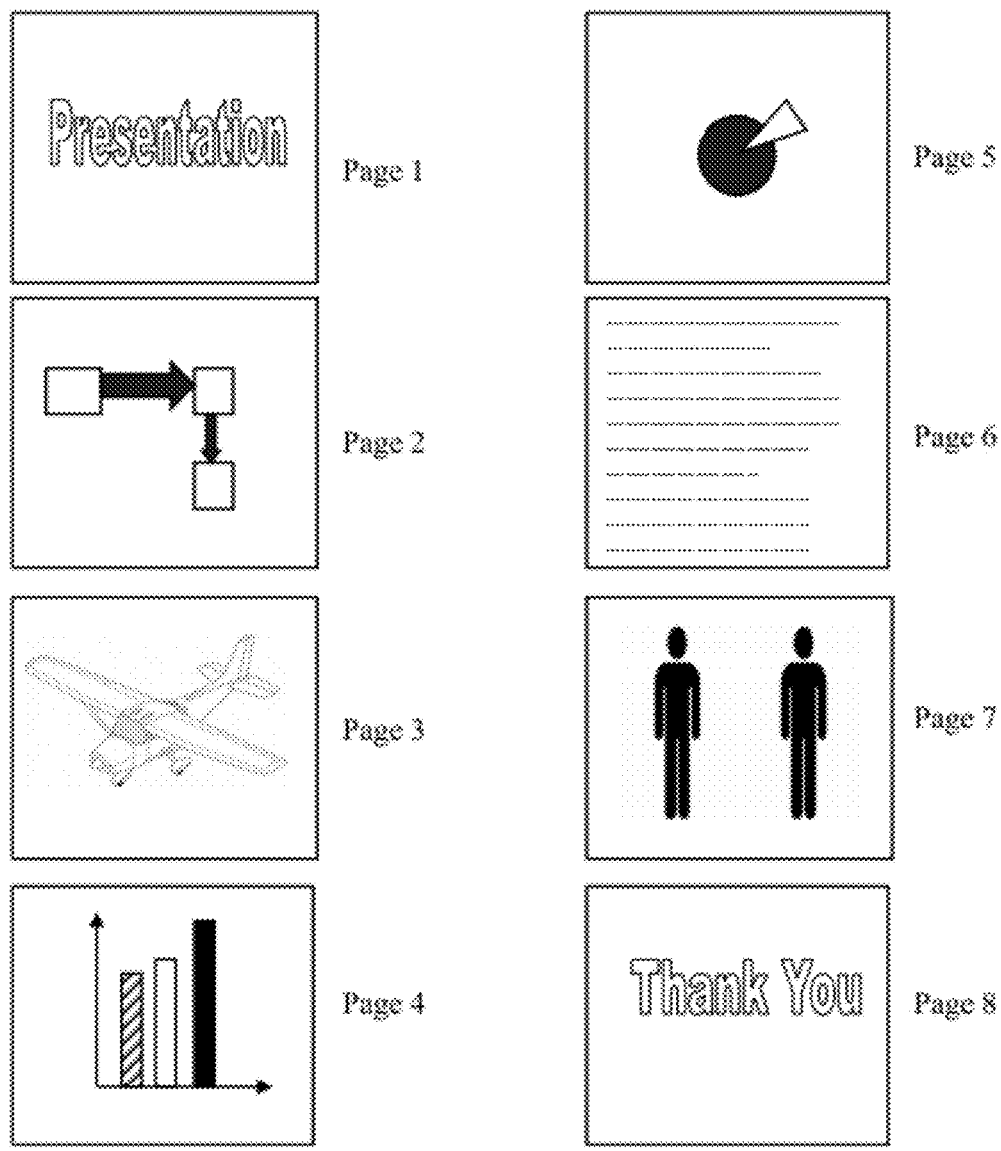
FIG. 10 illustrates an example of pages of an input document received by an image processing apparatus, such as image processing apparatus 100 depicted in FIG. 1A.
Figure 11B:
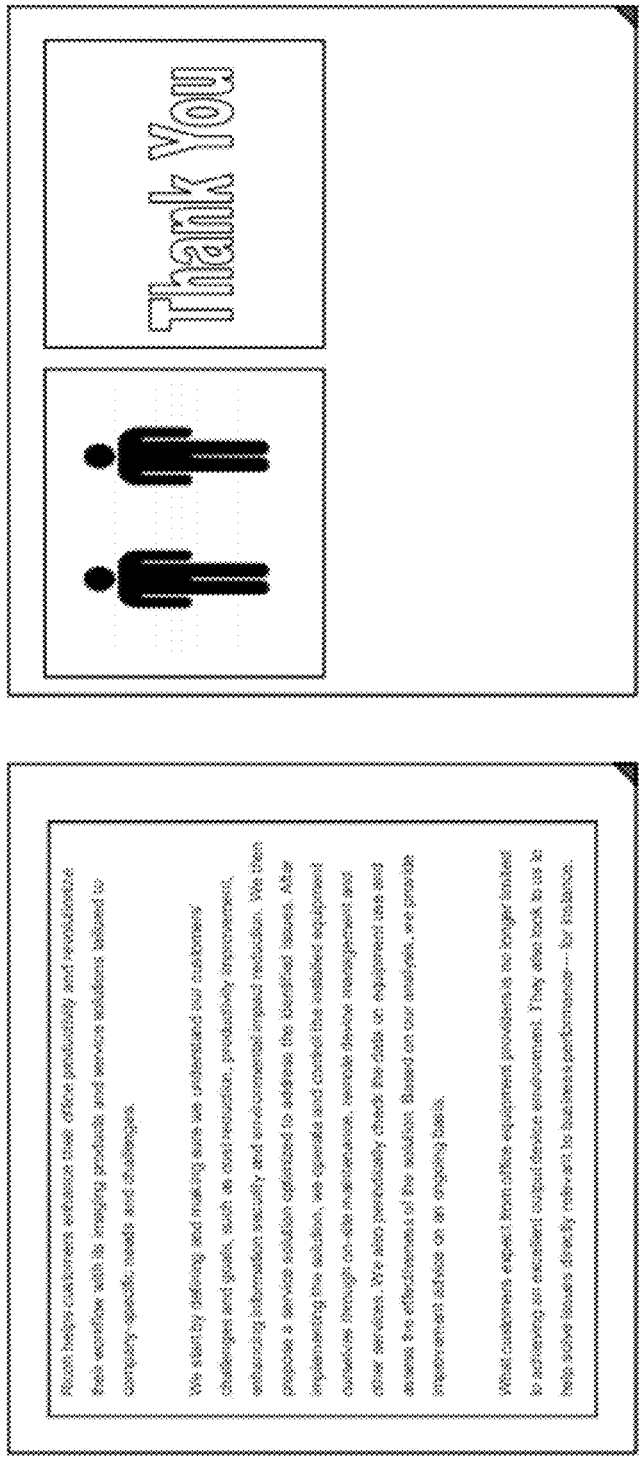

FIGS. 10-12 described another example according to an exemplary embodiment, wherein the intelligent image processing apparatus 100 of the present application generates a combined-page output job using a 4 page/sheet setting. FIG. 10 illustrates an input image document include 8 pages of information. Using the aspects of other embodiments of this disclosure, the apparatus 100 may determine that information page 6 of the input document is not suitable for output in a combined-page print mode. Thereafter, the processing part processes the input document of FIG. 10 to generate a combined-page output job with 4 pages per sheet as illustrated in FIGS. 11A and 11B. As seen in FIGS. 11A and 11B, each of the specific ones of the pages of the input document that have been determined to be unsuitable for reproduction in a combined-page print format (i.e. Page 6 of the input document of FIG. 10) has been assigned to a separate, dedicated page of the combined-page output job (i.e. page 2, side 1 in FIG. 11B), preferably in an enlarged size.

Figure 12A:
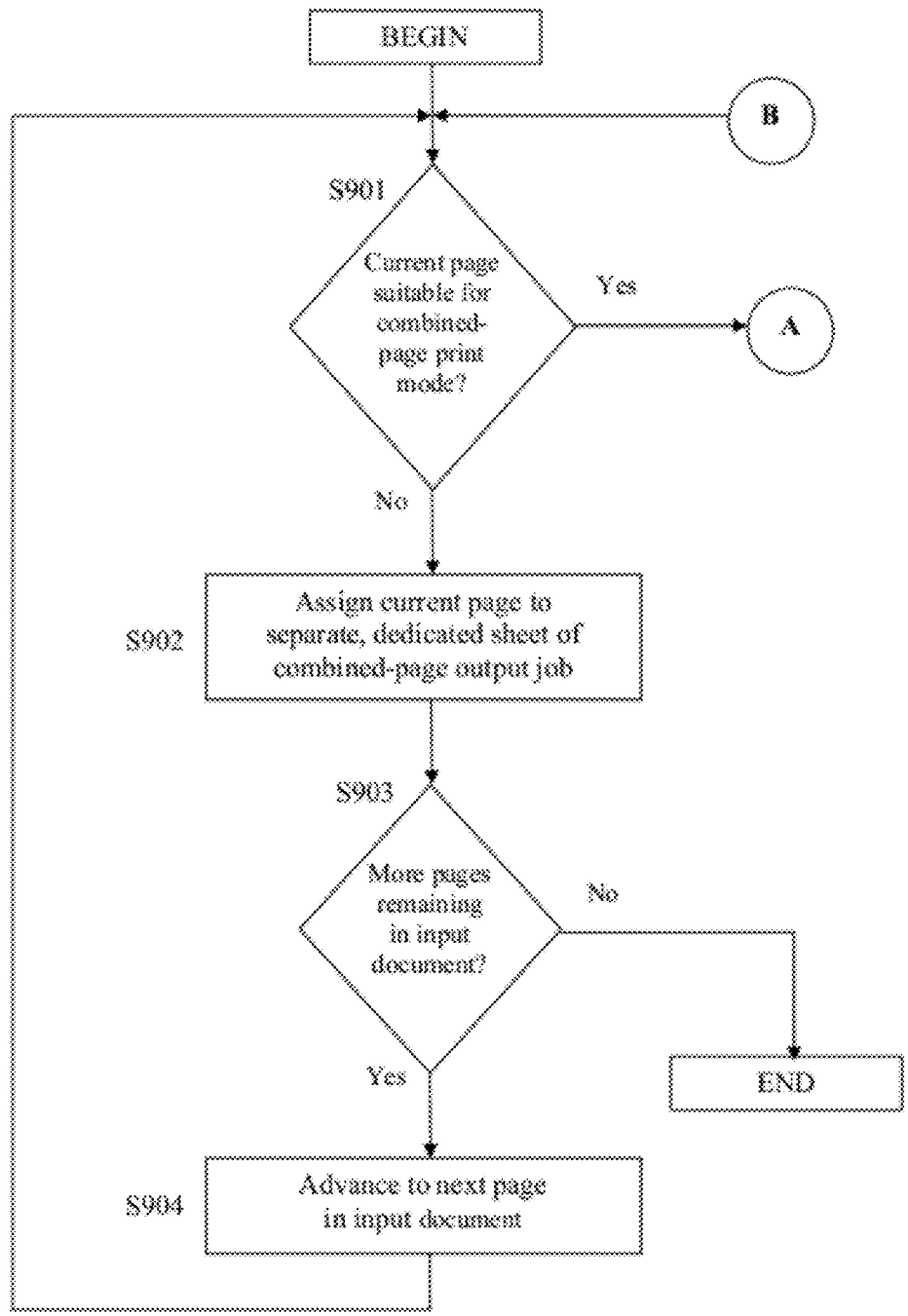
FIGS. 12A and 12B show a flowchart of a method performed by an image processing apparatus, such as image processing apparatus 100 illustrated in FIG. 1A, according to an exemplary embodiment.
Figure 12B:
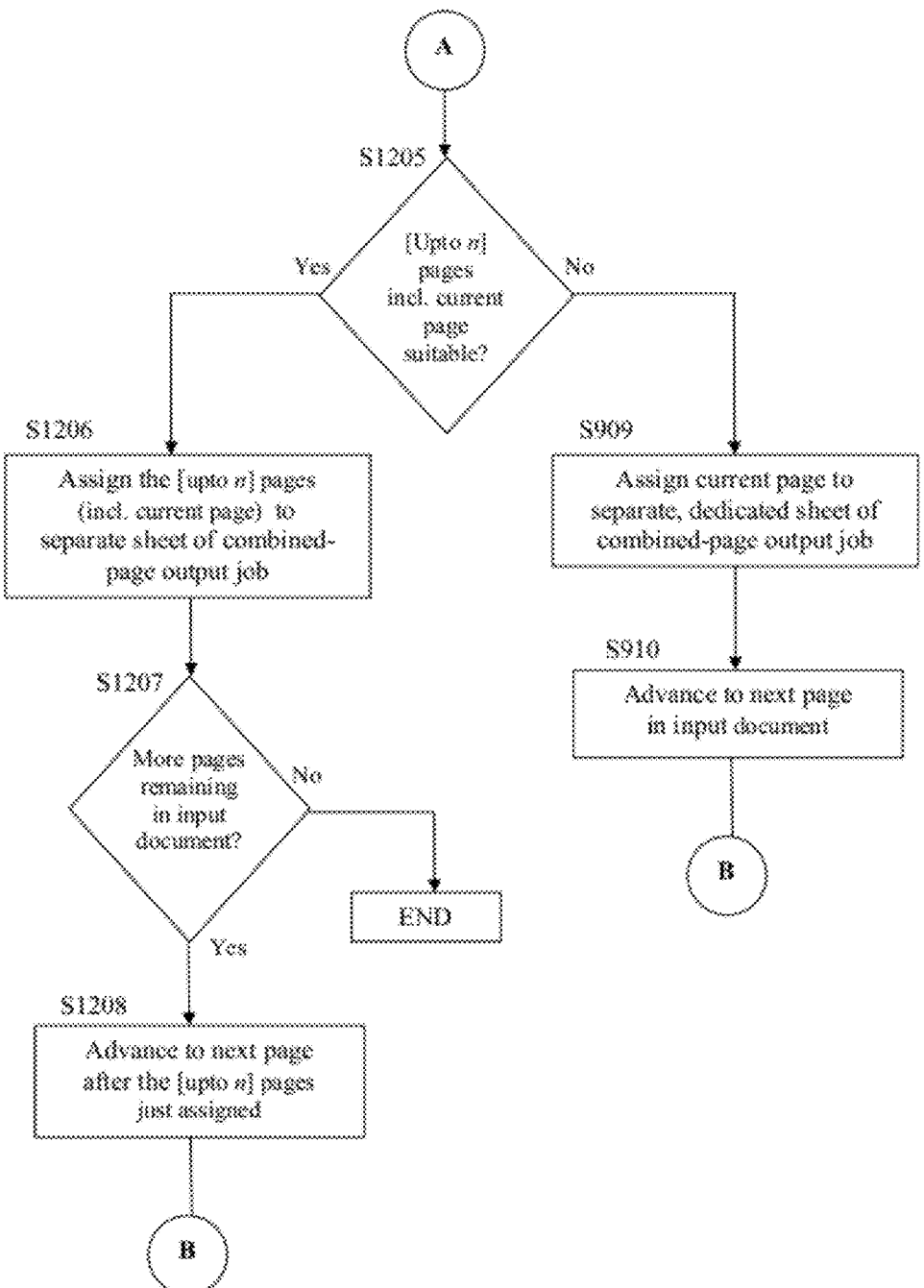

FIGS. 12A and 12B depict a flowchart of a method perform by an image processing apparatus 100 in order to generate a combined-page print output job such as that illustrated in FIGS. 11A and 11B. That is, the apparatus 100 performs the method of FIGS. 12A and 12B to generate a combined-page output job for an "n"-up or "n" pages/sheet setting, where n is a positive integer. For example, in the example of FIGS. 11A and 11B, n=4.

Steps S901 through S904 of FIG. 12A are the same as S901 through S904 illustrated in FIG. 9A, except that if in S901 the apparatus determines that the current page is suitable for combined page print mode (S901, Yes), then the flow proceeds to S1205.

In S1205 the apparatus determines whether [upto n] pages (including the current page and pages subsequent to the current page, as arranged in the predetermined order of the input document) are all suitable for output in the combined-page print mode with n pages per sheet. For example, if the current page is page 1 of the input document of FIG. 10, then in S1205 the apparatus will determine that [upto n=4] pages (i.e. exactly 4 pages, including the current page 1 and pages 2-3 subsequent to the current page 1 as arranged in the input document of FIG. 10) are suitable for output in the combined-page print mode. As another example, if the current page is page 7 of the input document of FIG. 10, then in S1205 the apparatus will determine that [upto n=4] pages (i.e. 2 pages, including the current page 7 and page 8 subsequent to the current page 7 as arranged in the input document of FIG. 10) are suitable for output in the combined-page print mode.

If the apparatus determines that [upto n] pages (including the current page and pages subsequent to the current page, as arranged in the predetermined order of the input document) are all suitable for output in the combined-page print mode (S1205, yes), then in S1206 the apparatus assigns the aforementioned [upto n] pages to be included in a single side of a paper sheet of the combined-page output job. For example, if the current page is page 1 of the input document of FIG. 10, then in S1206 the apparatus will assign 4 pages (including the current page 1 and pages 2-3 subsequent to the current page 1 as arranged in the input document of FIG. 10) to be included in a single side of a paper sheet of the combined-page output job. See page 1, side 1 of FIG. 11A. As another example, if the current page is page 7 of the input document of FIG. 10, then in S1206 the apparatus will assign 2 pages (including the current page 7 and page 8 subsequent to the current page 7 as arranged in the input document of FIG. 10) to be included in a single side of a paper sheet of the combined-page output job. See page 2, side 2 of FIG. 11B.

Thereafter, in S1207 the apparatus determines whether any other pages (other than the [upto n] pages that were just assigned) still remain to be analyzed in the input document. If no other pages remain (S1207, No), then the process ends. If other pages remain (S1207, Yes), then in S1208 the page analyzed by the apparatus (i.e. the 'current' page) is advanced to after the [upto n] pages that were just assigned in S1206. For example, if the current page is page 1 of the input document, and pages 1-4 of the input document have already been assigned in S1206, then in S1208 the 'current' page is advanced so that the new current page in the next iteration of the method will be page 5 of the input document. The workflow then returns to S901.

In S1205, If the apparatus determines that [upto n] pages (including the current page and pages subsequent to the current page, as arranged in the predetermined order of the input document) are not suitable for output in the combined-page print mode (S1205, No), then the workflow proceeds to S909. For example, if the current page is page 5 of the input document, the apparatus will determine in S1205 that the page after the current page (i.e. page 6 of the input document) is not suitable for output in the combined-page print mode (S1205, No), and the workflow will proceed to S909. S909 and S910 are the same as those illustrated in FIGS. 9A and 9B.

Referring to page 2, side 2 of FIG. 11B, it can be seen that only two pages are outputted in the combined-page print mode. According to this embodiment, the sizes of these pages is still reduced to a size necessary for 4-page per sheet printing mode, in order to reduce toner consumption. However, these pages may be increased in size. For example, the pages (appearing in page 2, side 2 of FIG. 11B) may be enlarged according to fit a 2-page per sheet print mode (FIG. 11C). The image processing apparatus 100 may also determine the sizes and orientations of these pages based on the orientations and format of the original input document. For example, if the pages 7 and 8 in the original input document (FIG. 10) are in a landscape format, then the apparatus 100 may determine that reducing the sizes of the pages to a 4-page per sheet format as seen in FIG. 11B may appear superior to altering the dimensions of the pages to make them fit in a 2-page per sheet format.

According to another aspect of this disclosure, the image processing apparatus 100 may automatically output the combined-page output job, or may offer the user the option of outputting the input document in its original format or settings. A user interface part of the image processing apparatus 100 may generate and display comparative information indicating the differences between outputting the input document in the original settings and outputting the input document in the intelligent combined-print page mode of this disclosure.

For example, the image processing apparatus 100 may display the user interface screen of FIG. 13 on a display screen of the apparatus. As seen in FIG. 13, the user interface screen includes comparative information indicating the differences between outputting the input document in the original settings and outputting the input document according to the intelligent combined-page print mode of this disclosure. In the example of FIG. 13, an output job is received with original print settings of simplex mode (one-sided printing) and no N-up mode (i.e. no combined pages, only one page per surface), identified as 'Plan B' settings. In contrast, the combined-page print mode in the example of FIG. 13 includes duplex print (two-sided) printing and 4-up or 4 pages per sheet, identified as 'Plan A' settings. The apparatus 100 may calculate and display various comparative data, such as the savings in terms of paper, in terms of paper cost, in terms of pages and copy costs when charged by page, in terms of printing time, and so forth, as seen in FIG. 13.

According to another embodiment of this disclosure, the image processing apparatus 100 may include a power saving aspect wherein the apparatus 100 automatically enters a sleep mode, standby mode, hibernate mode, lower-power mode, etc. at an appropriate time, based on historical job pattern data.

For example, the apparatus 100 may store usage history information that reflects a history of jobs performed on the apparatus. An example of usage history information is illustrated in FIG. 14. As seen in FIG. 14, the usage history may include a log of all jobs performed and the times at which they are performed. Based on this usage history information, the processing part 100*a* may determine an appropriate time to enter the power saving mode. As one example, if the latest time a job was performed by the apparatus during a specific time period (such as yesterday, or last week, or last month) is at a particular time t1, then the processing part 100*a* causes the apparatus 100 to enter the power saving mode at this time t1 on the current day. As another example, if the average of the latest times a job was performed by the apparatus during a specific time period (such as yesterday, or last week, or last month) is a particular time t2, then the processing part 100*a* causes the apparatus 100 to enter the power saving mode at this time t2 on the current day. As yet another example, if the latest time a job was performed by the apparatus during a specific day of the week (such as last Wednesday, for example) is at a particular time t3, then the processing part 100*a* causes the apparatus 100 to enter the power saving mode at this time t3 on the following Wednesday. As a further example, if the average of the latest times a job was performed by the apparatus during a specific day of the week (such as all the Mondays in July, for example) is at a particular time t4, then the processing part 100*a* causes the apparatus 100 to enter the power saving mode at this time t4 on the following Monday.

Thus, according to this exemplary embodiment, the apparatus determines conditions for automatically entering a sleep mode, based on historical job pattern data on usage history information.

Figure 15:
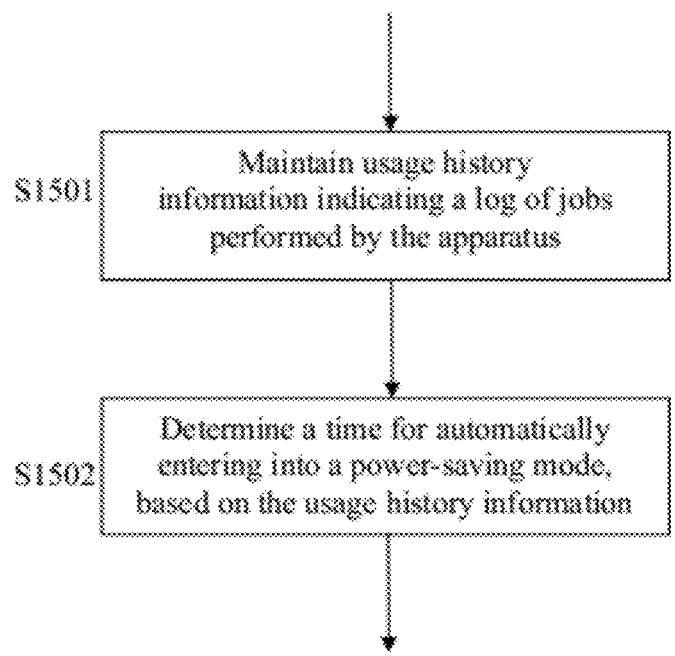
FIG. 15 shows a flowchart of a method performed by an image processing apparatus, such as image processing apparatus 100 illustrated in FIG. 1A, according to another exemplary embodiment.

Turning now to FIG. 15, there is shown a flowchart of a method performed by an image processing apparatus, such as image processing apparatus 100 illustrated in FIG. 1A, according to an exemplary embodiment.

In S1501, the apparatus maintains usage history information indicating a log of jobs performed by the apparatus. An example of a table registering usage history information is illustrated in FIG. 14. Then in S1502, the apparatus determines a time for automatically entering into a power-saving mode, based on the usage history information maintained in S1501.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. An image processing apparatus comprising:
a print job processing part configured to
receive an input document that includes a plurality of pages,
determine, based on, for each particular page amongst the plurality of pages, a data format of data for the particular page, whether there are one or more groups of two or more consecutive pages in the input document that are suitable for output in a combined-page print mode, wherein in the combined-page print mode, N-pages (N being an integer greater than one) in the one or more groups of two or more consecutive pages are output onto a single page as N-pages per sheet, and
process the input document to generate an N-pages per sheet combined-page output job wherein for each of said one or more groups of two or more consecutive pages in the input document that are determined based on the data format of data for each of the particular pages to be suitable for output in the N-pages per sheet combined-page print mode, image size of each page amongst N-pages of the two or more consecutive pages is reduced and reduced-size images of said N-pages are combined to a single page in the N-pages per sheet combined-page output job; and
an output part configured to cause a hardcopy of said N-pages per sheet combined-page output job to be printed by a printing device,
wherein when the combined-page print mode is set for output of N-pages per sheet, the print job processing part determines that a group of pages determined to be suitable for output in a combined-page print mode but does not include N consecutive pages, is suitable for output of M pages per sheet (M being less than N and greater than one), image size of each of the pages in the group is reduced and the group of reduced-size pages is output in the combined-page print mode at M pages per sheet, and
wherein each other page that is not suitable for output in the combined-page print mode at N pages per sheet and that is not suitable for output in the combined-page print mode at M pages per sheet is output on a separate dedicated sheet.

2. The image processing apparatus of claim 1, wherein the print job processing part determines specific ones of the pages of the input document unsuitable for output in a combined-page print mode and,
each of a plurality of different pages of the combined-page output job includes one of the pages of the input document unsuitable for output in the combined-page print mode, and does not include any other pages of the input document.

3. The image processing apparatus of claim 1, wherein said plurality of pages of information of the input document are arranged in a predetermined order, and
if a combined-page print mode setting is set to n-pages per sheet, then the print job processing part causes upto n pages of the input document that are arranged consecutively in the predetermined order to be included in a single page of the combined-page output job.

4. The image processing apparatus of claim 1, wherein the print job processing part generates paper consumption information and printing time information corresponding to the combined-page output job.

5. The image processing apparatus of claim 1, wherein the print job processing part maintains usage history information indicating a log of jobs performed by the apparatus, and determines a time for automatically entering into a power-saving mode, based on said usage history information.

6. The image processing apparatus of claim 5, wherein the print job processing part determines the time for automatically entering into a power-saving mode to be a last time a job was performed during a previous day, as indicated in the usage history information.

7. An image processing apparatus comprising:
a print job processing part configured to
receive an input document that includes a plurality of pages,
determine, based on, for each particular page amongst the plurality of pages, a quantity of text in the particular page, whether there are one or more groups of two or more consecutive pages in the input document that are suitable for output in a combined-page print mode, wherein in the combined-page print mode, N-pages (N being an integer greater than one) in the one or more groups of two or more consecutive pages are output onto a single page as N-pages per sheet, and
process the input document to generate an N-pages per sheet combined-page output job wherein for each of said one or more groups of two or more consecutive pages in the input document that are determined based on the quantity of text in each of the particular pages to be suitable for output in the N-pages per sheet combined-page print mode, image size of each page amongst N-pages of the two or more consecutive pages is reduced and reduced-size images of said N-pages are combined to a single page in the N-pages per sheet combined-page output job; and
an output part configured to cause a hardcopy of said N-pages per sheet combined-page output job to be printed by a printing device,
wherein the print job processing part determines whether to use combined-page print mode on a page-by-page basis,
wherein when the combined-page print mode is set for output of N-pages per sheet, the print job processing part determines that a group of pages determined to be suitable for output in a combined-page print mode but does not include N consecutive pages, is suitable for output of M pages per sheet (M being less than N and greater than one), image size of each of the pages in the group is reduced and the group of reduced-size pages is output in the combined-page print mode at M pages per sheet, and
wherein each other page that is not suitable for output in the combined-page print mode at N pages per sheet and that is not suitable for output in the combined-page print mode at M pages per sheet is output on a separate dedicated sheet.

8. An image processing method performed by an image processing apparatus, comprising:
receiving an input document that includes a plurality of pages;
determining, by the image processing apparatus based on, for each particular page amongst the plurality of pages, a data format of data for the particular page, whether there are one or more groups of two or more consecutive pages in the input document that are suitable for output in a combined-page print mode, wherein in the combined-page print mode, N-pages (N being an integer greater than one) in the one or more groups of two or more consecutive pages are output onto a single page as N-pages per sheet;

processing, by the image processing apparatus, the input document to generate an N-pages per sheet combined-page output job wherein for each of said one or more groups of two or more consecutive pages in the input document that are determined based on the data format of data for each of the particular pages to be suitable for output in the N-pages per sheet combined-page print mode, image size of each page amongst N-pages of the two or more consecutive pages is reduced and reduced-size images of said N-pages are combined to a single page in the N-pages per sheet combined-page output job; and determining, when the combined-page print mode is set for output of N-pages per sheet, that a group of pages determined to be suitable for output in a combined-page print mode but does not include N consecutive pages, is suitable for output of M pages per sheet (M being less than N and greater than one), reducing an image size of each of the pages in the group and outputting the group of reduced-size pages in the combined-page print mode at M pages per sheet, and outputting on a separate dedicated sheet each other page that is not suitable for output in the combined-page print mode at N pages per sheet and that is not suitable for output in the combined-page print mode at M pages per sheet.

9. The method of claim 8, further comprising:
determining whether a particular page of the input document is suitable for output in a combined-page print mode based on a quantity of text in the particular page.

10. The method of claim 8, further comprising
determining specific ones of the pages of the input document unsuitable for output in a combined-page print mode,
wherein each of a plurality of different pages of the combined-page output job includes one of the pages of the input document unsuitable for output in the combined-page print mode, and does not include any other pages of the input document.

11. The method of claim 8, wherein
said plurality of pages of the input document are arranged in a predetermined order, and
if a combined-page print mode setting is set to n-pages per sheet, then upto n pages of information of the input document that are arranged consecutively in the predetermined order are included in a single page of the combined-page output job.

12. The method of claim 8, further comprising:
generating and displaying paper consumption information and printing time information corresponding to the combined-page output job.

13. The method of claim 8, further comprising:
maintaining usage history information indicating a log of jobs performed by the apparatus; and
determining a time for automatically entering into a power-saving mode, based on said usage history information.

14. The method of claim 13, wherein the time for automatically entering into a power-saving mode is determined to be a last time a job was performed during a previous day, as indicated in the usage history information.

* * * * *